United States Patent
Chua et al.

(10) Patent No.: US 11,073,615 B2
(45) Date of Patent: Jul. 27, 2021

(54) PROXIMITY SENSOR MODULE WITH TWO SENSORS

(71) Applicant: LITE-ON SINGAPORE PTE. LTD., Midview (SG)

(72) Inventors: Seng-Yee Chua, Singapore (SG); Arakere Dinesh Gopalaswamy, Bangalore (IN); Guang-Li Song, Singapore (SG)

(73) Assignee: LITE-ON SINGAPORE PTE. LTD., Midview (SG)

( * ) Notice: Subject to any disclaimer, the term of this patent is extended or adjusted under 35 U.S.C. 154(b) by 277 days.

(21) Appl. No.: 16/105,531

(22) Filed: Aug. 20, 2018

(65) Prior Publication Data
US 2020/0057158 A1 Feb. 20, 2020

(51) Int. Cl.
*G01S 17/04* (2020.01)
*G01S 7/481* (2006.01)

(52) U.S. Cl.
CPC ............. *G01S 17/04* (2020.01); *G01S 7/4811* (2013.01); *G01S 7/4813* (2013.01)

(58) Field of Classification Search
CPC ..... G01S 17/026; G01S 7/4813; G01S 7/4811
See application file for complete search history.

(56) References Cited

U.S. PATENT DOCUMENTS

| | | | | |
|---|---|---|---|---|
| 4,309,605 A * | 1/1982 | Okabe | .................. | G01V 8/12 250/239 |
| 4,340,813 A * | 7/1982 | Sauer | .............. | H03K 17/9631 250/221 |
| 8,420,999 B2 * | 4/2013 | Costello | ............... | G01D 11/245 220/520 |
| 8,487,256 B2 * | 7/2013 | Kwong | ................. | G01J 1/0214 250/338.1 |
| 8,604,436 B1 * | 12/2013 | Patel | .................... | H03K 17/941 250/338.1 |
| 8,675,706 B2 * | 3/2014 | Seurin | .................. | H01S 5/4018 372/50.124 |
| 8,677,605 B2 * | 3/2014 | Lim | ..................... | H03K 17/941 29/595 |
| 8,928,893 B2 * | 1/2015 | Findlay | ............... | H03K 17/941 250/214 AL |
| 9,151,829 B2 * | 10/2015 | Campbell | ............... | G01S 17/10 |
| 9,223,407 B2 * | 12/2015 | Hsu | .......................... | H04N 5/04 |
| 9,322,901 B2 * | 4/2016 | Kerness | .................. | G01S 17/58 |

(Continued)

*Primary Examiner* — David P Porta
*Assistant Examiner* — Djura Malevic
(74) *Attorney, Agent, or Firm* — Li & Cai Intellectual Property (USA) Office (57) ABSTRACT

A proximity sensor module with two sensors, including a package housing, a circuit substrate, an light emitter and a sensing assembly. The package housing includes a first package structure, a second package structure, a partition structure, a first accommodating space defined by the first package structure and the partition structure, and a second accommodation space defined by the second package structure and the partition structure. The light emitter is arranged in the first accommodating space and is disposed on the circuit substrate. The sensing assembly includes a first sensor and a second sensor. The first sensor and the second sensor are arranged in the second accommodating space, and the first sensor is farther from the light emitter than the second sensor.

9 Claims, 4 Drawing Sheets

(56) References Cited

U.S. PATENT DOCUMENTS

| | | | |
|---|---|---|---|
| 9,564,569 B1* | 2/2017 | Wang | H01L 25/167 |
| 9,737,215 B2* | 8/2017 | Hu | A61B 5/0059 |
| 9,865,765 B2* | 1/2018 | Hsu | G01S 7/4813 |
| 10,122,847 B2* | 11/2018 | Alameh | H04M 1/72569 |
| 10,147,835 B2* | 12/2018 | Chen | H01L 31/02005 |
| 10,274,599 B2* | 4/2019 | Schmalenberg | G01S 17/89 |
| 10,396,783 B2* | 8/2019 | Chan | G01S 7/4813 |
| 10,559,708 B2* | 2/2020 | Chua | H01L 31/02325 |
| 2006/0016994 A1* | 1/2006 | Basoor | G01V 8/12 250/338.1 |
| 2007/0127039 A1* | 6/2007 | Njolstad | G01S 17/04 356/624 |
| 2008/0006762 A1* | 1/2008 | Fadell | G01J 1/44 250/201.1 |
| 2008/0296478 A1* | 12/2008 | Hernoult | G01J 1/02 250/216 |
| 2010/0078562 A1* | 4/2010 | Dinh | G01R 3/00 250/339.06 |
| 2010/0109021 A1* | 5/2010 | Horio | H01L 31/167 257/82 |
| 2010/0277740 A1* | 11/2010 | Hulteen | G01N 21/55 356/445 |
| 2010/0327164 A1* | 12/2010 | Costello | H01L 24/97 250/338.1 |
| 2011/0004327 A1* | 1/2011 | Bonnat | G06F 3/0346 700/83 |
| 2011/0024627 A1* | 2/2011 | Yao | G01J 1/04 250/338.4 |
| 2011/0121181 A1* | 5/2011 | Costello | G01S 7/4813 250/338.1 |
| 2011/0163233 A1* | 7/2011 | Ng | G01J 5/20 250/338.4 |
| 2011/0180693 A1* | 7/2011 | Ritter | G01J 9/00 250/214 A |
| 2011/0204233 A1* | 8/2011 | Costello | H03K 17/941 250/338.4 |
| 2011/0226952 A1* | 9/2011 | Shih | G01J 1/02 250/338.1 |
| 2011/0248152 A1* | 10/2011 | Svajda | G01S 3/7835 250/221 |
| 2013/0020588 A1* | 1/2013 | Yong | H01L 33/486 257/82 |
| 2013/0327931 A1* | 12/2013 | Hsu | G01S 7/4813 250/237 R |
| 2014/0002410 A1* | 1/2014 | Lillie | G06F 3/0418 345/174 |
| 2014/0191253 A1* | 7/2014 | Haslbeck | H01L 31/02162 257/82 |
| 2014/0218340 A1* | 8/2014 | Rai | G01S 17/04 345/175 |
| 2014/0231635 A1* | 8/2014 | Kerness | H01L 31/02325 250/226 |
| 2015/0115138 A1* | 4/2015 | Heng | G01S 17/04 250/216 |
| 2015/0212208 A1* | 7/2015 | Hanada | H01L 31/0203 250/221 |
| 2015/0323670 A1* | 11/2015 | Shirasaka | G01J 1/0214 250/206.1 |
| 2016/0146938 A1* | 5/2016 | Becker | G01S 17/04 250/208.2 |
| 2016/0234365 A1* | 8/2016 | Alameh | H04W 52/0254 |
| 2016/0239093 A1* | 8/2016 | Chua | G06F 3/0416 |
| 2016/0259056 A1* | 9/2016 | Heng | G01S 7/4813 |
| 2016/0296117 A1* | 10/2016 | Hu | A61B 5/6824 |
| 2017/0160427 A1* | 6/2017 | Costello | G01V 8/12 |
| 2017/0186886 A1* | 6/2017 | Weng | G01S 7/481 |
| 2017/0284864 A1* | 10/2017 | Chen | G01J 1/04 |
| 2017/0301661 A1* | 10/2017 | Makimura | H01L 31/035272 |
| 2019/0154801 A1* | 5/2019 | Gani | G01S 7/4816 |
| 2020/0057158 A1* | 2/2020 | Chua | G01S 7/4813 |

* cited by examiner

PROXIMITY SENSOR MODULE WITH TWO SENSORS

FIELD OF THE DISCLOSURE

The present disclosure relates to a proximity sensor module, and more particularly to a proximity sensor module with two sensors.

BACKGROUND OF THE DISCLOSURE

The proximity sensor module is provided in the display screen of the mobile device to detect the user's face, ears, or hair, and would temporarily turn off the display screen when the near-distance object is detected, thereby saving battery power. In addition, during a call, the proximity sensor module may also prevent the mobile devices from being mistouched by the user's ears or face, which may interfere with the ongoing call.

Proximity sensors with small or no exterior openings are in demand in the mobile device market. However, in a proximity sensor with small or no exterior openings, the far-infrared signal emitted outward by the proximity sensor from the inner side of the display screen would be significantly decreased, and the cross-talk effect caused by the signals being reflected from the inner side of the display screen would be increased.

Moreover, conventional mobile devices generally use a surface coated glass panel, which is coated with various color coating and functional coating according to particular implementation, as a display screen. However, the coated glass panel has higher transmittance and reflectivity than a non-coated glass panel or an opaque panel. As a result, a stronger cross-talk effect is produced, and the cross-talk effect reduces the signal-to-noise ratio detected by the proximity sensor and makes the proximity sensor fail to effectively detect nearby objects.

In view of the above reasons, how the proximity sensor can be enabled to sense the near-distance object in low far infrared transmission efficiency and high cross-talk effect by the improvement of the structural design has become a project to be solved.

SUMMARY OF THE DISCLOSURE

In response to the above-referenced technical inadequacies, the present disclosure provides a proximity sensor module with two sensors, one of the two sensors receives the reflected light reflected by a near-distance test object, and the other sensor receives the reflected light reflected by a far-distance object, so that the proximity sensor module with two sensors can detect the near-distance object even in a high cross-talk effect environment.

In one aspect, the present disclosure provides a proximity sensor module with two sensors including a package housing, a circuit substrate, a light emitter, and a sensing assembly. The package housing includes a first package structure, a second package structure, a partition structure, a first accommodating space which is defined by the first package structure and the partition structure, and a second accommodation space which is defined by the second package structure and the partition structure. The circuit substrate supports the first package structure and the second package structure. The light emitter is arranged in the first accommodating space and is disposed on the circuit substrate. The sensing assembly includes a first sensor and a second sensor. The first sensor and the second sensor are arranged in the second accommodating space, and the first sensor is farther from the light emitter than the second sensor. The first sensor is configured to receive a first reflected light emitted from the light emitter and reflected by a near-distance object, and the second sensor is configured to receive a second reflected light emitted from the light emitter and reflected by a far-distance object.

In one aspect, the present disclosure provides a proximity sensor module with two sensors including a package housing, a circuit substrate, a light emitter, a sensing assembly, and an optical isolator. The package housing includes a first package structure, a second package structure, a first partition structure, a second partition structure, a first accommodating space which is defined by the first package structure and the first partition structure, a second accommodation space which is defined by the first partition structure and the second partition structure, and a third accommodation space which is defined by the second package structure and the second partition structure. The circuit substrate supports the first package structure and the second package structure. The light emitter is arranged in the first accommodating space and is disposed on the circuit substrate. The sensing assembly includes a first sensor and a second sensor, the first sensor is arranged in the second accommodating space and is disposed on the circuit substrate, the second sensor is arranged in the third accommodating space and is disposed on the circuit substrate, and the first sensor is closer to the light emitter than the second sensor. The optical isolator is disposed on the second partition structure for limiting the sensing angle of the second sensor. The first sensor is for receiving a first reflected light emitted from the light emitter and reflected by a near-distance object, and the second sensor for receiving a second reflected light emitted from the light emitter and reflected by a far-distance object.

Therefore, the first sensor can receive a first reflected light emitted from the light emitter and reflected by a near-distance object, and the second sensor can receive a second reflected light emitted from the light emitter and reflected by a far-distance object by the features of "the light emitter is arranged in the first accommodating space and is disposed on the circuit substrate" and "the first sensor and the second sensor are arranged in the second accommodating space and the first sensor is farther from the light emitter than the second sensor".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
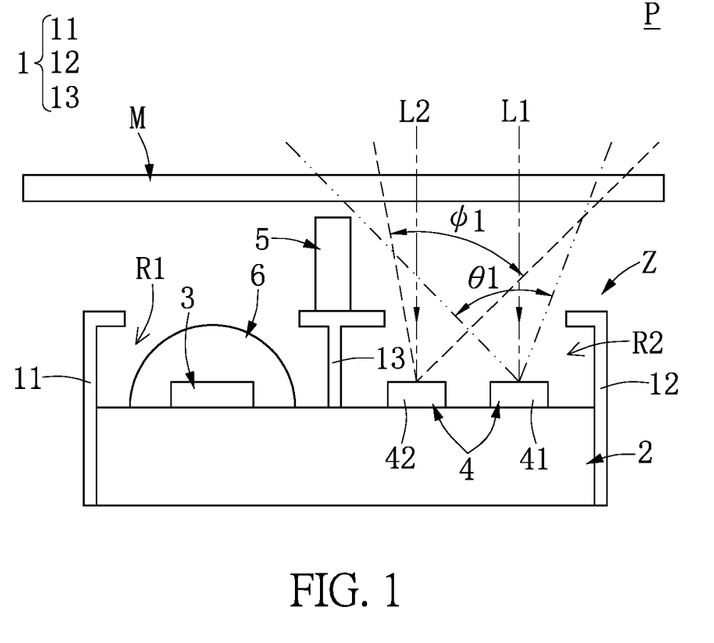
FIG. 1 is a cross-sectional view of a mobile device using a proximity sensor module with two sensors according to a first embodiment of the present disclosure.

Referring to FIG. 1, a first embodiment of the present disclosure provides a cross-sectional view of a mobile device P1 using a proximity sensor module Z with two sensors according to a first embodiment of the present disclosure. The proximity sensor module Z is disposed inside of a panel M of the mobile device P1 and includes a package housing 1, a circuit substrate 2, a light emitter 3, and a sensing assembly 4. In the first embodiment, the panel M of the mobile device P1 using the proximity sensor module Z is a surface-coated glass panel, but the present disclosure is not limited thereto.

Moreover, the package housing 1 has a first package structure 11, a second package structure 12, a partition structure 13, a first accommodating space R1 defined by the first package structure 11 and the partition structure 13, and a second accommodation space R2 defined by the second package structure 12 and the partition structure 13. The circuit substrate 2 supports the first package structure 11 and the second package structure 12. The light emitter 3 is arranged in the first accommodating space R1 and is disposed on the circuit substrate 2.

As shown in FIG. 1, the sensing assembly 4 includes a first sensor 41 and a second sensor 42. The first sensor 41 and the second sensor 42 are arranged in the second accommodating space R and are disposed on the circuit substrate 2, and the first sensor 41 is farther from the light emitter 3 than the second sensor 42. In addition, the first sensor 41 is for receiving a first reflected light L1 emitted from the light emitter 3 and reflected by a near-distance object, and the second sensor 42 is for receiving a second reflected light L2 emitted from the light emitter 3 and reflected by a far-distance object.

More particularly, since the second sensor 42 is adjacent to the partition structure 13, the light from the side of the partition structure 13 is blocked by the partition structure 13 and may not be received by the second sensor 42. Therefore, a sensing angle φ1 of the second sensor 42 which is adjacent to the side of the partition structure 13 is limited. In other words, due to the isolation of the partition structure 13, the second sensor may be unable to receive the light emitted from the light emitter 3 and reflected by the panel M. The view of the first sensor 41 is only restricted by the second package structure 12 which is adjacent thereto, so that a sensing angle θ1 of the first sensor 41 may cover the light from the side of the partition structure 13.

By the structures described above, most of the light that the first sensor 41 receives can be a first reflected light L1 emitted from the light emitter 3 and reflected by the near-distance object, and most of the light that the second sensor 42 receives can be a second reflected light L2 emitted from the light emitter 3 and reflected by the far-distance object.

More specifically, as shown in FIG. 1, the proximity sensor module Z further includes an optical isolator 5 disposed on the partition structure 13 for limiting the sensing angle φ1 of the second sensor 42. As shown in FIG. 1, since the optical isolator 5 elongates the height of the partition structure 13, the sensing angle φ1 of the second sensor 42 can be, but is not limited to being, further limited. In another embodiment, the sensing angle φ1 of the second sensor 42 may be limited only by the partition structure 13.

Furthermore, when the spacing between the panel M and the proximity sensor module Z is narrow, the sensing angle θ1 of the first sensor 41 can be limited without the optical isolator 5. When the spacing between the panel M and the proximity sensor module Z is wide, the disposition of the optical isolator 5 can not only block the second sensor 42 from receiving cross-talk light reflected by the panel M, but also obstruct leaked light from between the panel M and the proximity sensor module Z and the external light, so as to further reduce the cross-talk effect. In addition, the optical isolator 5 is made from an opaque material. Preferably, the optical isolator 5 is made from an opaque material with stretchability.

Referring to FIG. 1, the proximity sensor module Z further includes a first lens 6. As shown in FIG. 1, the first lens 6 is arranged in the first accommodating space R1 and is disposed on the circuit substrate 2, and the first lens 6 covers the light emitter 3. By the configuration of the first lens 6, the light path from the light emitter 3 can be better controlled. In other embodiments of the present disclosure, the light path from the light emitter 3 may be controlled by other methods.

Specifically, the light emitter 3 of the proximity sensor module Z is an infrared light emitting diode, but the present disclosure is not limited thereto. In other embodiments, the light emitter 3 may be other light sources used in proximity sensors.

The cross-talk light received by the second sensor 42 is greatly reduced by the inclusion of the two sensors, the first sensor 41 being disposed away from the light emitter 3, and the second sensor 42 being disposed close to the light emitter 3, and by the inclusion of the partition structure 13 between the light emitter 3 and the second sensor 42. By the structure described above, the proximity sensor module Z of the present disclosure can allow the first sensor 41 to receive the light and the cross-talk light emitted from the light emitter 3 and reflected by the panel M, and allow the second sensor 42 to receive the light emitted from the light emitter 3 and reflected by the far-distance object.

Second Embodiment

Figure 2:
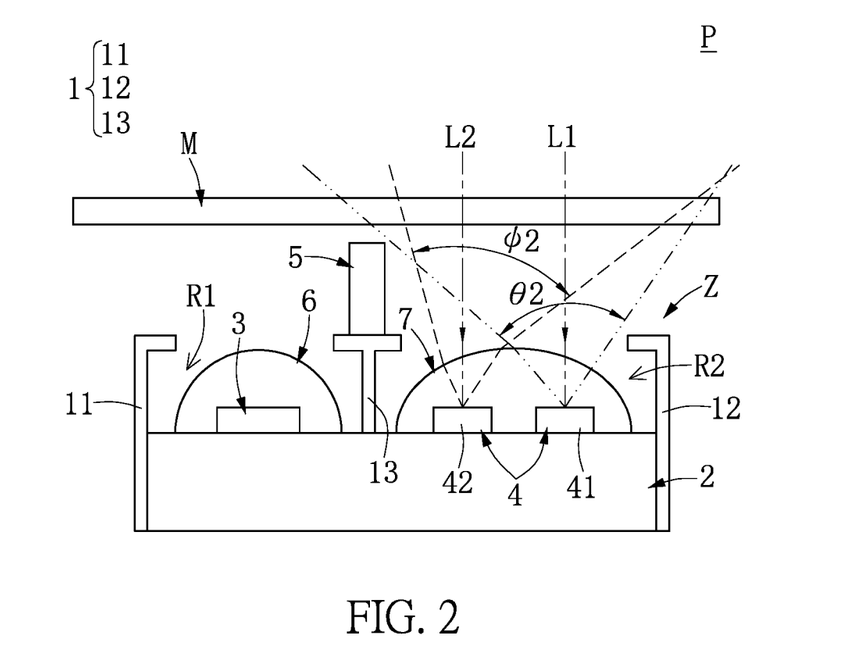
FIG. 2 is a cross-sectional view of a mobile device using a proximity sensor module with two sensors according to a second embodiment of the present disclosure.

Referring to FIG. 2, a second embodiment of the present disclosure is similar to the first embodiment, in which similar elements have the same reference numerals and functions as those of the first embodiment, and will not be repeated herein. The difference between the two embodiments is that the proximity sensor module Z of the second embodiment further includes an optical path correcting element. As shown in FIG. 2, in the second embodiment, the optical path correcting element is a second lens 7 which covers the first sensor 41 and the second sensor 42, and the first sensor 41 and the second sensor 42 are respectively disposed on opposite sides of the main axis of the second lens 7.

Furthermore, in FIG. 2, a sensing angle θ2 of the first sensor 41 could be shifted towards the direction of the light emitter 3 by the adjustment of the second lens 7, and a sensing angle φ2 of the second sensor 42 could be shifted away from the direction of the light emitter 3 by the adjustment of the second lens 7.

By the structures described above, the proximity sensor module Z of the present disclosure can allow the first sensor 41 to receive more of the light from the light emitter 3 and reflected by the panel M and the near-distance object, while allowing the second sensor 42 to receive less of the light from the light emitter 3 and reflected by the panel M and the near-distance object, thereby achieving a better proximity sensing effect.

It should be noted that the optical path correcting element is not limited to the implementation described above. In other embodiments, the optical path correcting element may be an element or a structure other than a lens.

Third Embodiment

Figure 3:
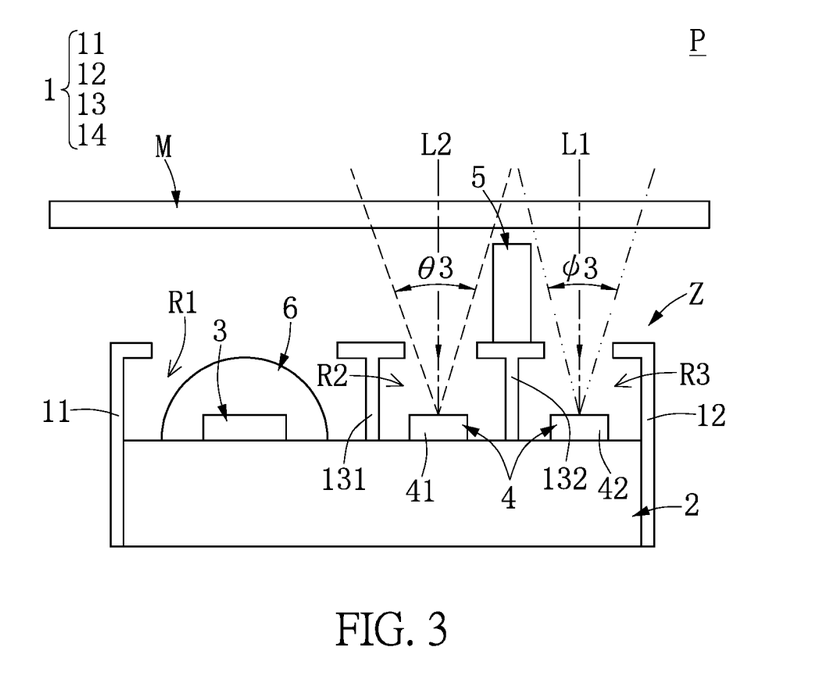
FIG. 3 is a cross-sectional view of a mobile device using a proximity sensor module with two sensors according to a third embodiment of the present disclosure.

Referring to FIG. 3, a third embodiment of the present disclosure is substantially the same as the first and second embodiments, and similar elements or configurations will not be described again herein. One of the differences in the third embodiment is that the package housing 1 of the proximity sensor module Z of the third embodiment further includes a first package structure 11, a second package structure 12, a first partition structure 131, a second partition structure 132, a first accommodating space R1 defined by the first package structure 11 and the first partition structure 131, a second accommodation space R2 defined by the first partition structure 131 and the second partition structure 132, and a third accommodation space R3 defined by the second package structure 12 and the second partition structure 132.

Further, another difference is that, in the first embodiment and the second embodiment, the first sensor 41 is farther from the light emitter 3 than the second sensor 42; however, in the third embodiment, the first sensor 41 is closer to the light emitter 3 than the second sensor 42. Furthermore, in the third embodiment, the first sensor 41 is arranged in the second accommodating space R2 and is disposed on the circuit substrate 2, and the second sensor 42 is arranged in the third accommodating space R3 and is disposed on the circuit substrate 2. Moreover, the optical isolator 5 of the proximity sensor module Z of the third embodiment is disposed on the second partition structure 132 for limiting the sensing angle φ3 of the second sensor 42.

The first sensor 41 of the third embodiment is the same as that of the first embodiment, for receiving the first reflected light L1 emitted from the light emitter 3 and reflected by a near-distance object; and the second sensor 42 of the third embodiment is the same as that of the first embodiment, for receiving a second reflected light L2 emitted from the light emitter 3 and reflected by a far-distance object.

More particularly, the second sensor 42 of the third embodiment is farther from the light emitter 3 than the second sensor 42 of the first and second embodiments, and the optical isolator 5 blocks the light emitted from the light emitter 3 and reflected by the panel M. Therefore, the probability of the second sensor 42 receiving the light (cross-talk light) emitted from the light emitter 3 and reflected by the panel M is smaller than that of the second sensor 42 of the first and second embodiments. In addition, sensor is closer to the light emitter 3 than the first sensor 41 of the first and second embodiments, so that the first sensor 41 of the third embodiment can receive more light emitted from the light emitter 3 and reflected by the panel M and the near-distance object.

Accordingly, by the structures described above, the first sensor 41 can receive the first reflected light L1 emitted from the light emitter 3 and reflected by the near-distance object, and the second sensor 42 can receive the second reflected light L2 emitted from the light emitter 3 and reflected by a far-distance object, so as to enhance the proximity sensing capability of the proximity sensor module Z.

Figure 4:
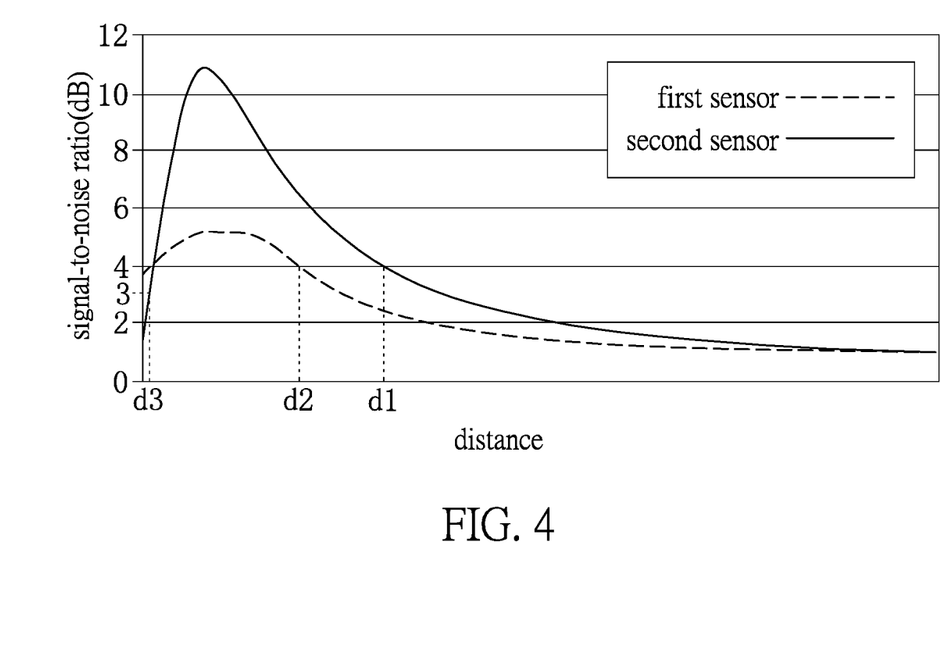
FIG. 4 shows a signal-to-noise ratio of the proximity sensor module with two sensors according to a third embodiment of the present disclosure during operation.

FIG. 4 shows a signal-to-noise ratio of the proximity sensor module Z with two sensors according to the third embodiment of the present disclosure during operation. As shown in FIG. 4, when the first and second sensors 41, 42 are at a closest sensing distance to the panel M, the first sensor 41 would have a higher signal-to-noise ratio than the second sensor 42. As the sensing distance increases, the signal received by the first sensor 41 would decrease while the signal received by the second sensor 42 would increase, and thus the second sensor 42 would have a higher signal-to-noise ratio than the first sensor 41.

Further referring to FIG. 4, the first sensor 41 and the second sensor 42 may respectively have a near threshold value and a far threshold value. For instance, when the near threshold value of the first sensor 41 and that of the second sensor 42 is 4 dB, the far threshold value of the first sensor 41 and that of the second sensor 42 is 3 dB, and an object to be sensed is approaching the panel M, the object to be sensed would trigger the near threshold values of the first and second sensors 41, 42 when the distance from the panel M is d1 and d2, respectively. Then, the mobile device P would determine that an object is nearing the panel M according to the triggered near threshold values of the first and second sensors 41, 42 and set the panel M to sleep mode. As the object to be sensed continues approaching the panel M to the distance d3, the far threshold value of the second sensor 42 would be triggered. However, since the signal-to-noise ratio of the first sensor 41 is higher than 3 dB at this time, the far threshold value of the first sensor 41 will not be triggered. Therefore, the mobile device P will not restart the screen since the determination of whether the object has left the panel M is not determined only by the far threshold value of the second sensor 42 being triggered.

Therefore, the proximity sensor module Z can increase the range of proximity sensing and reduce the probability of misjudgments, and enhance the sensing capability toward low reflectivity objects (e.g. hair).

In conclusion, by matching the features of "the light emitter 3 is arranged in the first accommodating space R1 and is disposed on the circuit substrate 2" and "the first sensor 41 and the second sensor 42 are arranged in the second accommodating space R2, and the first sensor 41 is farther from the light emitter 3 than the second sensor 42", the first sensor 41 can receive the reflected light L1 emitted from the light emitter 3 and reflected by sensor the near-distance object, and second sensor 42 can receive the second reflected light L2 emitted from the light emitter 3 and reflected by a far-distance object.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A proximity sensor module with two sensors, comprising:
    a package housing including a first package structure, a second package structure, a partition structure, a first accommodating space defined by the first package structure and the partition structure, and a second accommodation space defined by the second package structure and the partition structure;
    a circuit substrate supporting the first package structure and the second package structure;
    a light emitter arranged in the first accommodating space and disposed on the circuit substrate;
    a sensing assembly including a first sensor and a second sensor arranged in the second accommodating space and disposed on the circuit substrate, the first sensor being farther from the light emitter than the second sensor; and
    an optical isolator disposed on the partition structure for limiting a sensing angle of the second sensor;
    wherein the first sensor is configured to receive a first reflected light emitted by the light emitter and reflected by a near-distance object, and the second sensor is configured to receive a second reflected light emitted from the light emitter and reflected by a far-distance object;
    wherein the first sensor has a higher signal-to-noise ratio than the second sensor for the near-distance object, and the second sensor has a higher signal-to-noise ratio than the first sensor for the far-distance object.

2. The proximity sensor module with two sensors according to claim 1, further comprising a first lens arranged in the first accommodating space and disposed on the circuit substrate, wherein the first lens covers the light emitter.

3. The proximity sensor module with two sensors according to claim 1, wherein the light emitter is an infrared light emitting diode.

4. The proximity sensor module with two sensors according to claim 1, further comprising an optical path correcting element arranged in the second accommodating space, wherein a sensing angle of the first sensor is adjusted to shift toward a direction of the light emitter by the optical path correcting element, and the sensing angle of the second sensor is adjusted to shift away from the direction of the light emitter by the optical path correcting element.

5. The proximity sensor module with two sensors according to claim 4, wherein the optical path correcting element is a second lens covering the first sensor and the second sensor, wherein the first sensor and the second sensor respectively are disposed on opposite sides of the main axis of the second lens.

6. A proximity sensor module with two sensors, comprising:
    a package housing including a first package structure, a second package structure, a first partition structure, a second partition structure, a first accommodating space defined by the first package structure and the first partition structure, a second accommodation space defined by the first partition structure and the second partition structure, and a third accommodating space defined by the second partition structure and the second package structure;
    a circuit substrate supporting the first package structure and the second package structure;
    a light emitter arranged in the first accommodating space and disposed on the circuit substrate;
    a sensing assembly including a first sensor and a second sensor, the first sensor being arranged in the second accommodating space and disposed on the circuit substrate, the second sensor being arranged in the third accommodating space and disposed on the circuit substrate, and the first sensor being closer to the light emitter than the second sensor; and
    an optical isolator disposed on the second partition structure for limiting a sensing angle of the second sensor;
    wherein the first sensor is configured to receive a first reflected light emitted from the light emitter and reflected by a near-distance object, and the second sensor is configured to receive a second reflected light emitted from the light emitter and reflected by a far-distance object;
    wherein the first sensor has a higher signal-to-noise ratio than the second sensor for the near-distance object, and the second sensor has a higher signal-to-noise ratio than the first sensor for the far-distance object.

7. The proximity sensor module with two sensors according to claim 6, further comprising a first lens arranged in the first accommodating space and disposed on the circuit substrate, wherein the first lens covers the light emitter.

8. The proximity sensor module with two sensors according to claim 6, wherein the light emitter is an infrared light emitting diode.

9. A proximity sensor module with two sensors, comprising:
    a package housing including a first package structure, a second package structure, a first partition structure, a second partition structure, a first accommodating space defined by the first package structure and the first partition structure, a second accommodation space defined by the first partition structure and the second partition structure, and a third accommodating space defined by the second partition structure and the second package structure;
    a circuit substrate supporting the first package structure and the second package structure;
    a light emitter arranged in the first accommodating space and disposed on the circuit substrate;

a sensing assembly including a first sensor and a second sensor, the first sensor being arranged in the second accommodating space and disposed on the circuit substrate, the second sensor being arranged in the third accommodating space and disposed on the circuit substrate, and the first sensor being closer to the light emitter than the second sensor; and an optical isolator disposed on the second partition structure for limiting a sensing angle of the second sensor;

wherein the optical isolator protrudes from a top surface of the package housing;

wherein the first sensor is configured to receive a first reflected light emitted from the light emitter and reflected by a near-distance object, and the second sensor is configured to receive a second reflected light emitted from the light emitter and reflected by a far-distance object;

wherein the first sensor has a higher signal-to-noise ratio than the second sensor for the near-distance object, and the second sensor has a higher signal-to-noise ratio than the first sensor for the far-distance object.

\* \* \* \* \*